United States Patent [19]

Pfost et al.

[11] 4,020,325
[45] Apr. 26, 1977

[54] MAGNETIC CARD SUBSTITUTE FOR COINS FOR STARTING APPLIANCES AND THE LIKE

[75] Inventors: Robert Fred Pfost, Los Altos; Eugene S. Elkus, Atherton, both of Calif.

[73] Assignee: Service Distributors, Inc., San Francisco, Calif.

[22] Filed: Apr. 2, 1975

[21] Appl. No.: 564,345

[52] U.S. Cl. .......................... 235/61.7 B; 194/4 R
[51] Int. Cl.² ........................................ G06K 5/00
[58] Field of Search ............ 194/4 R, 4 C, 4 E, 4 F, 194/4 G; 360/79, 2; 235/61.11 R, 61.11 D, 61.7 B, 61.12 M

[56] References Cited

UNITED STATES PATENTS

| 3,570,643 | 3/1971 | Maierhofer | 194/4 R |
| 3,575,271 | 4/1971 | Constable et al. | 194/4 R |
| 3,578,124 | 5/1971 | Flum | 194/4 R |
| 3,653,480 | 4/1972 | Yamamoto et al. | 194/4 R |
| 3,831,193 | 8/1974 | McSweeney et al. | 235/61.11 D X |
| 3,836,753 | 9/1974 | Pass | 235/61.11 D |
| 3,935,933 | 2/1976 | Tanaka et al. | 194/4 R |
| 3,943,563 | 3/1976 | Lemelson | 360/2 X |

Primary Examiner—Robert B. Reeves
Assistant Examiner—Joseph J. Rolla
Attorney, Agent, or Firm—Julian Caplan

[57] ABSTRACT

A card having one or more magnetic strips is used by patrons to actuate laundry and vending machines and the like. An encoder at a central point is manually adjusted to "print" a selected number of "credit" pulses on the card strip and the card is sold to a patron. The patron inserts the card into a reader mounted on or near a laundry machine, vending machine, etc. The reader determines the number of pulses remaining on the strip, returns the card with one pulse erased and energizes a relay which starts the machine. Preferably, the reader displays the number of pulses on the card at time of insertion and those remaining after erasure.

27 Claims, 18 Drawing Figures

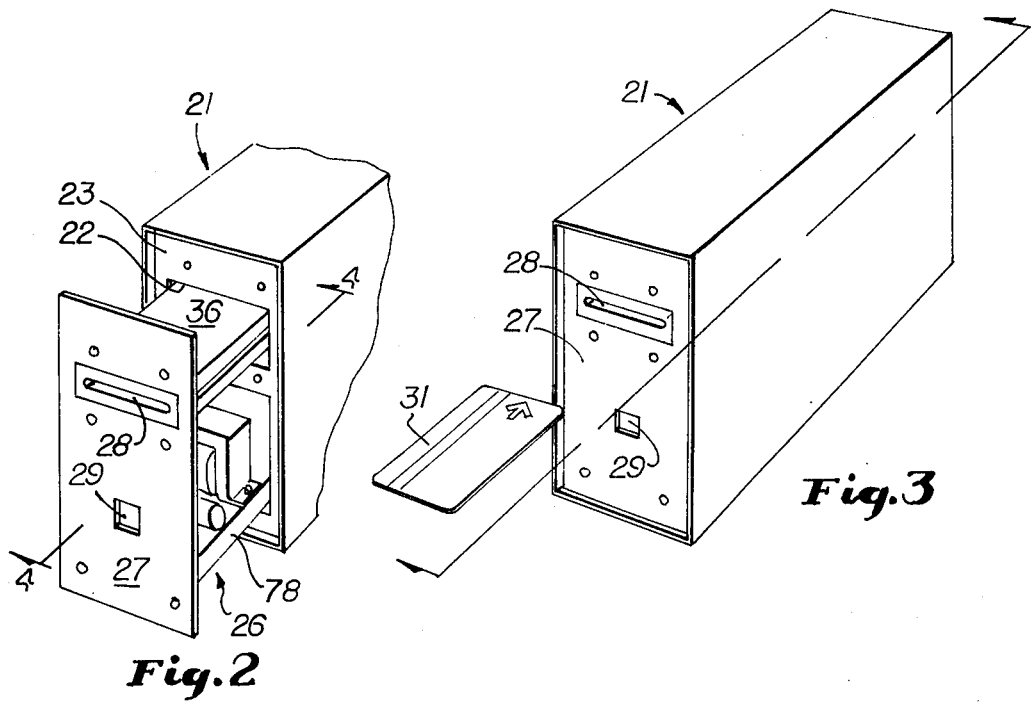
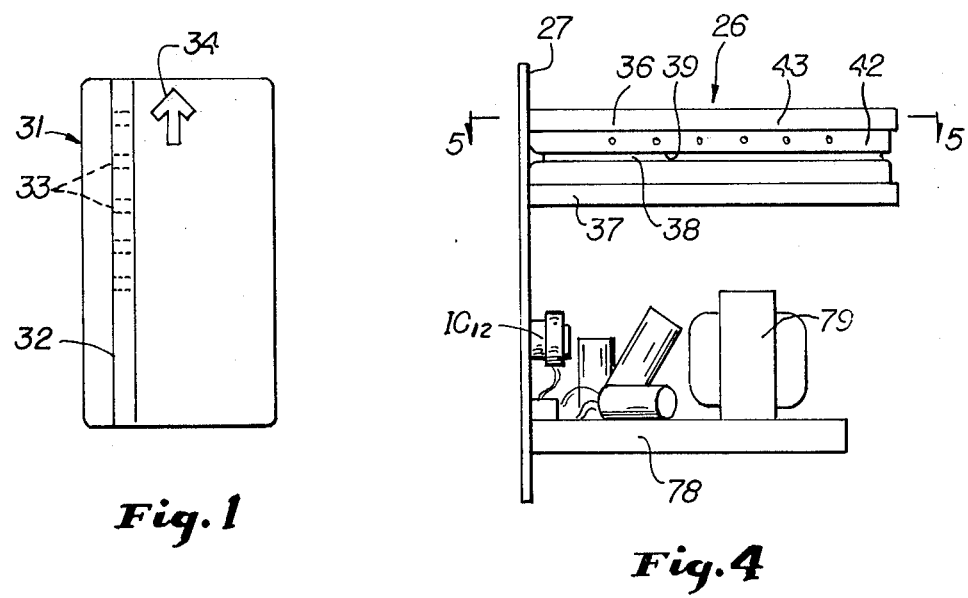
Fig.1  Fig.2  Fig.3  Fig.4

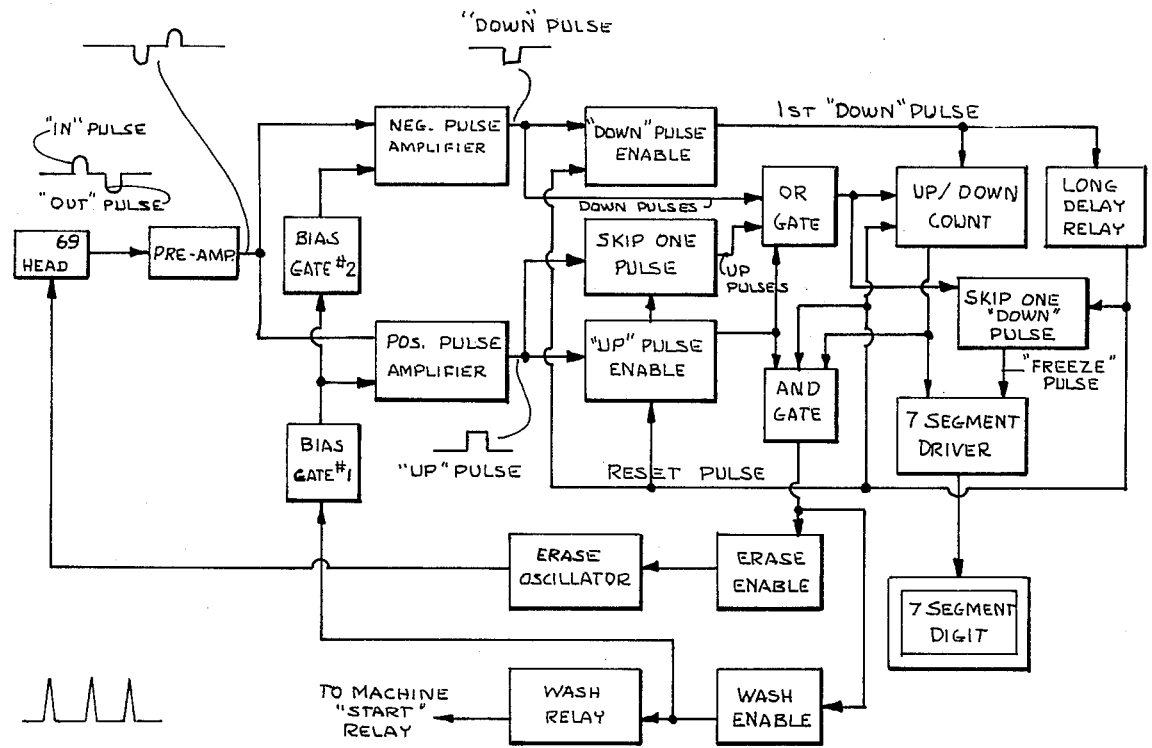
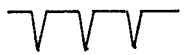
Fig. 12A
Fig. 12B
Fig. 13
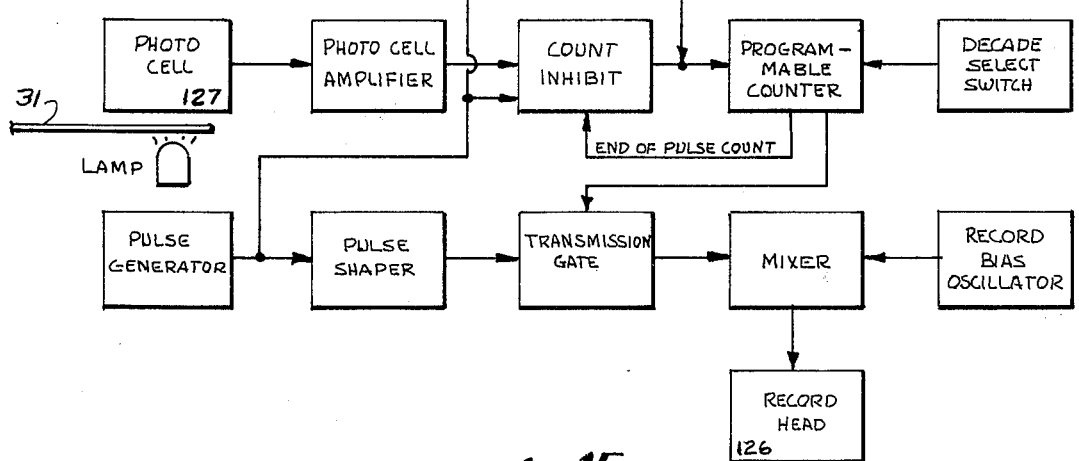

MAGNETIC CARD SUBSTITUTE FOR COINS FOR STARTING APPLIANCES AND THE LIKE

This invention relates to a new and improved system comprising a magnetic card, an encoder, and a reader as well as a method for using magnetic strip cards as a substitute for coins in actuating laundry and other vending machines.

A serious problem in the business of providing laundry and vending machines is the fact that dishonest patrons sometimes open coin boxes which entails not only the loss of the coins but the expense of repair of the coin boxes. Thus for a long time the need for a system to eliminate the use of coins in actuating machines of this type has existed, but the various substitutes for coins have not proven to be commercially satisfactory. Accordingly, it is the purpose of the present invention to provide a card having one or more magnetic strips printed thereon or affixed thereto which may be encoded for a given number of machine cycles, sold to patrons and used by patrons for one or more machine cycles.

One of the features of the present invention is the fact that the reader apparatus fits into the coin box of an existing type of laundry machine and is dimensioned so that it occupies the space occupied by a conventional coin acceptor in a vending machine or laundry machine. No change in the wiring of the existing equipment is required in order to make the same compatible with the present invention.

Another feature of the invention is the fact that the cards and equipment are suitable for use under the conditions existing in coin operated laundries. For example, there is frequently a considerable amount of steam originating in the laundry equipment, as well as dampness on the floor. The equipment is not affected by such conditions; and even if the card is dropped on a damp floor, it is not adversely affected.

Other features of the invention are its simple and inexpensive construction in that it uses few moving parts or other parts requiring maintenance and the electronic components are solid state.

One of the advantages of the present invention is the fact that it is unnecessary to modify either the encoder or the reader when it is necessary to change the price charged for the service or article vended. Heretofore, when coin acceptors have been used, each time a price change occurred a considerable amount of hardware was required to change the coin acceptors for the revised price; and, further, labor was required in installing new acceptors. These problems are eliminated in the use of the present invention.

Another feature of the invention is the fact that heretofore, for practical purposes, price changes have been limited to 5 cents differentials. The present invention makes it possible to change prices by lesser amounts and even by fractions of cents.

One of the features of the invention is the use of a pulse, hereinafter described in detail as a "saw tooth" pulse. Such a pulse enables the transducer of the reader to detect whether the magnetic card is being inserted in the reader or being withdrawn therefrom. This distinction enables the up/down counter of the reader to count up when the card is being inserted and to count down when the card is being withdrawn. Although in a preferred embodiment of the invention the card is transported into and out of the reader by a motor drive, nevertheless, by a modification which is set forth herein the card may be manually inserted and withdrawn. The sawtooth pulse has even more utility when the card is manually controlled.

Still another feature of the invention is the fact that each card is encoded with one more pulse than the nominal number of pulses or "credits" for which the card is sold. In the reader, the first pulse detected by the transducer is diverted or "skipped" so that it does not actuate the up/down counter. Thus when the counter counts down to zero, there is still one pulse on the card and this pulse is erased as the laundry or vending machine is energized. Thus even when the last credit is being used, there is still one pulse on the card to be erased after the counter has counted down to zero. Viewed from another standpoint, on the use of the card for the last credit, the first pulse does not energize the counter but is skipped as the card is inserted. The second pulse drives the counter up one count. On the withdrawal of the card, the first pulse drives the counter down to zero and the last pulse is then erased. Hence the card cannot be used subsequently to actuate the machine.

Other objects of the present invention will become apparent upon reading the following specification and referring to the accompanying drawings in which similar characters of reference represent corresponding parts in each of the several views.

In the drawings:

FIG. 1 is a top plan view of a typical card used in accordance with the present invention.

FIG. 2 is an exploded perspective view showing a portion of the reader used to read the card.

FIG. 3 is a perspective view showing the reader assembled and a card about to be inserted.

FIG. 4 is a vertical sectional view, somewhat schematic, through the reader taken substantially along the line 4—4 of FIG. 3.

Figure 5:
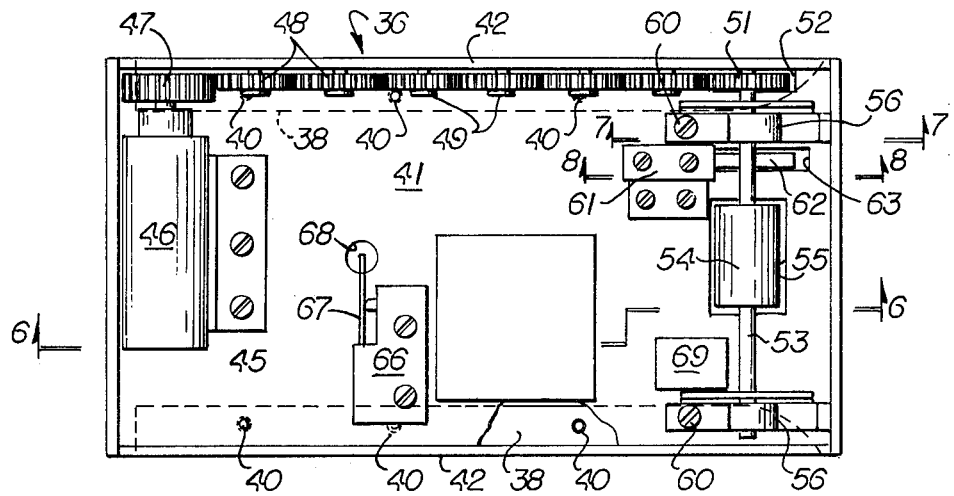
FIG. 5 is a horizontal sectional view taken substantially along the line 5—5 of FIG. 4.
Figure 7:
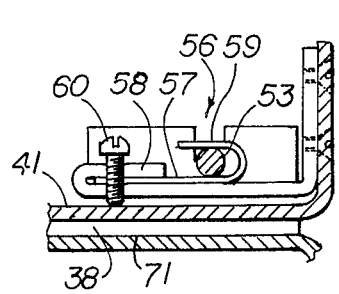
Figure 8:
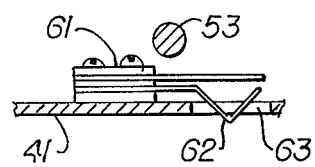

FIG. 7 and 8 are fragmentary sectional views taken substantially along the line 7—7 and 8—8 respectively of FIG. 5.

Figure 9:
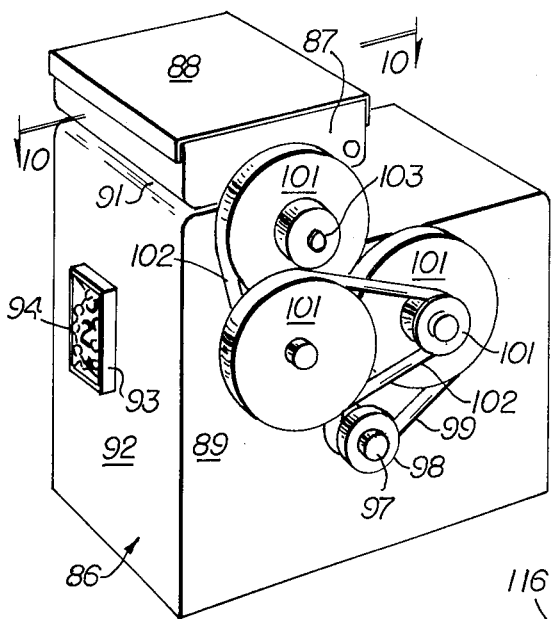

FIG. 9 is a perspective view of an encoder used in accordance with the invention.

Figure 10:
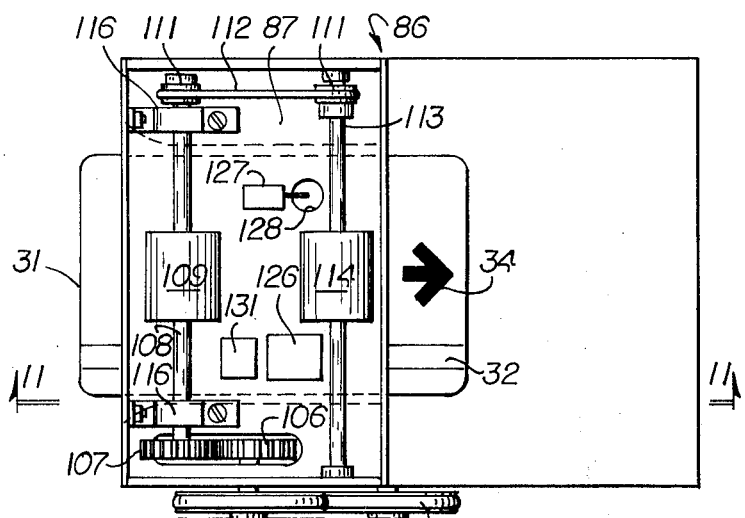

FIG. 10 is a horizontal sectional view taken substantially along the line 10—10 of FIG. 9.

Figure 11:
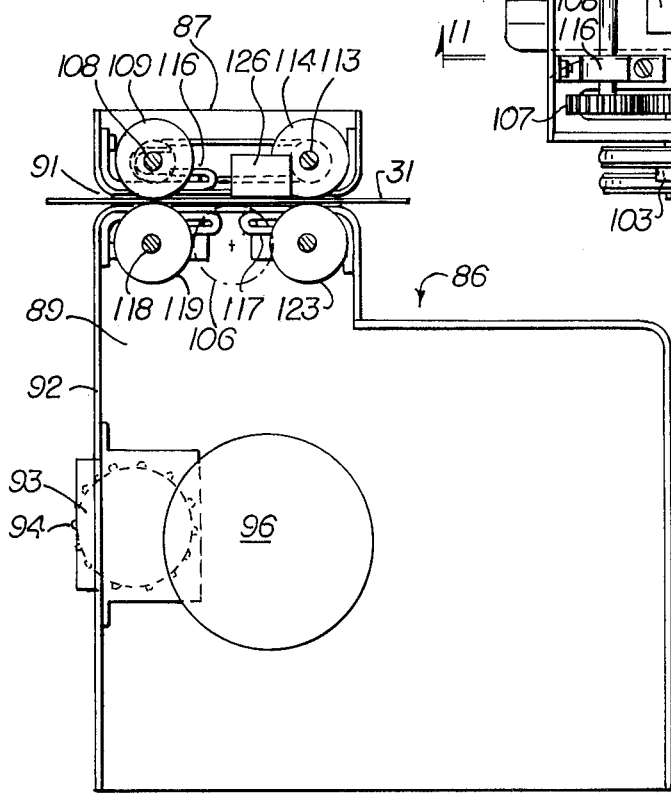

FIG. 11 is a vertical sectional view taken substantially along the line 11—11 of FIG. 10.

FIG. 12 is a diagrammatic representation of magnetic pulses encoded onto the magnetic strip of the card with flux density plotted against distance along the strip.

FIG. 12A is a diagrammatic representation of the signals generated in the reader when a card of the type shown in FIG. 1 having pulses recorded on it as shown in FIG. 12 is moving forward (inward) in the reader.

FIG. 12B is a representation similar to FIG. 12A showing the signal generated in the reader when the card is moving in the reverse direction.

FIG. 13 is a block diagram of the card reader.

Figure 14:
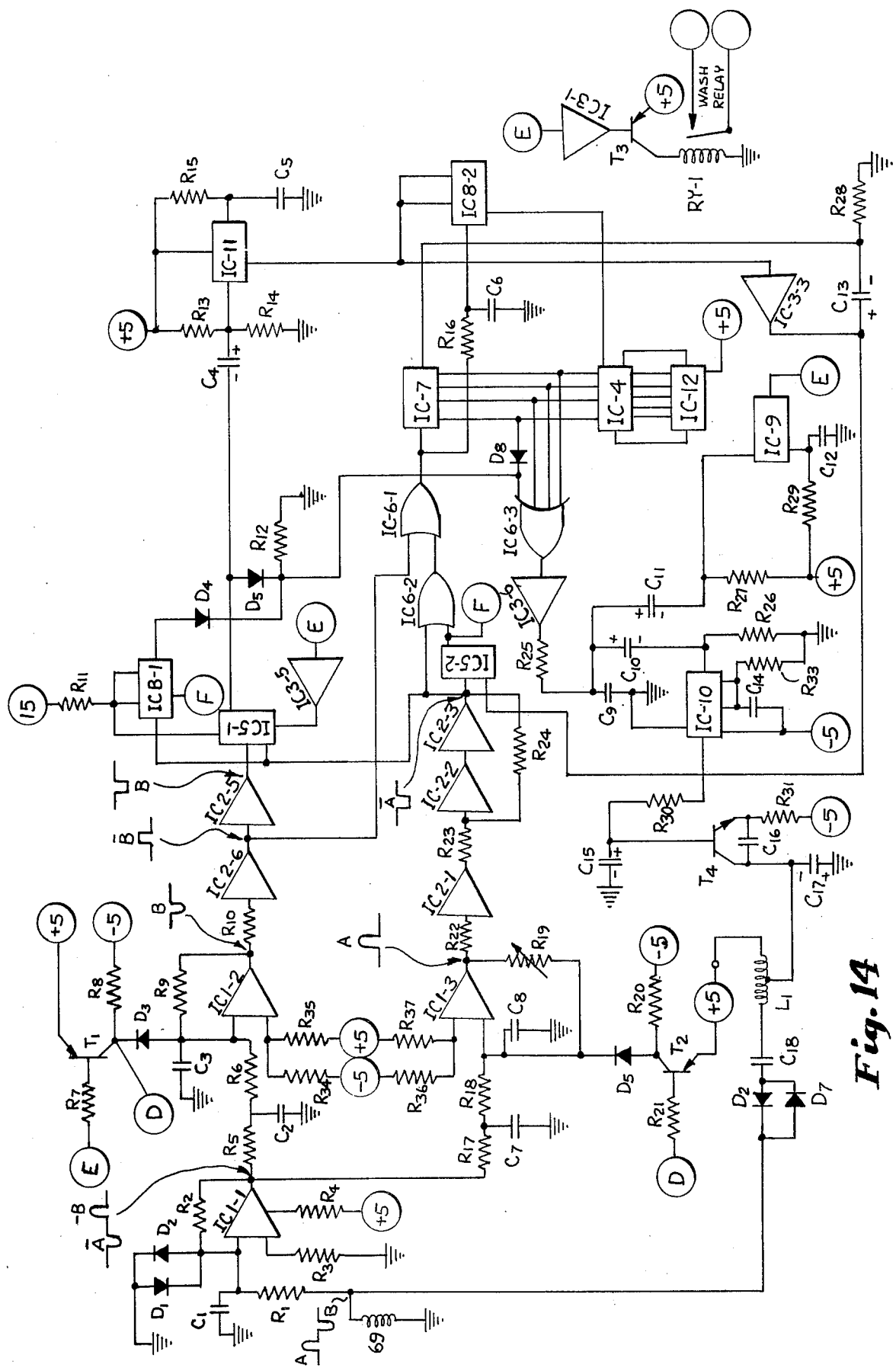

FIG. 14 is a schematic of the reader circuit.

FIG. 15 is a block diagram of the encoder.

Figure 16:
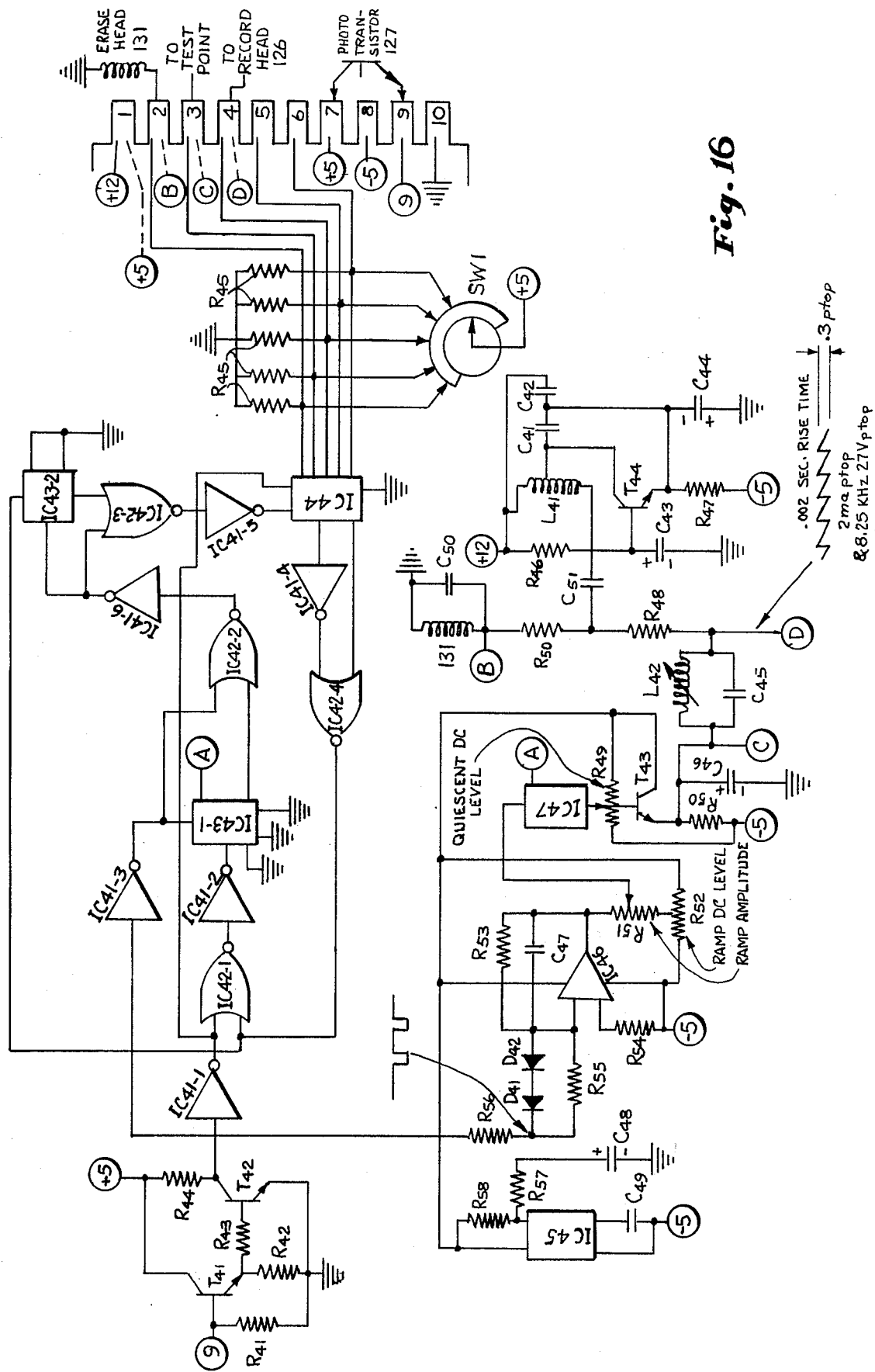

FIG. 16 is a schematic thereof.

Coin box 21 shown in FIGS. 2 and 3 is a rectangular metallic box of a type commonly used with coin acceptors in automatic laundry equipment. A pair of vertically spaced apart openings 22 is formed in the front panel 23 thereof. A feature of the present invention is the fact that it is adapted to fit into such a box 21 without modification, it being understood that other boxes may be substituted.

Fitting into the box 21 is a reader 26 having a front panel 27 compatible with panel 23 and formed with a slot 28 for reception of a card 31. Also formed in panel 27 is a display window 29 through which the patron may observe the number of "credits" (i.e. the number of times which a washing machine may be energized in accordance with the amount paid in the purchase of the card) at the beginning and at the completion of each use of the card.

Card 31 is subject to considerable modification. As shown, it is a thin rectangular member of cardboard or plastic having rounded corners and bearing one or more longitudinally extending magnetic strips 32 which may be printed or otherwise affixed thereon. Preferably, an arrow 34 is applied to indicate the direction of insertion of card 31 in slot 28. A plurality of magnetic pulses (indicated schematically by reference numeral 33 in FIG. 1) is applied to strip 32. The original number of pulses 33 applied depends on the amount charged the patron. Each time the card is used, one pulse 33 is removed.

Reader 26 comprises a top casing 36 horizontally disposed and having its forward end attached to panel 27 and a bottom casing 37 there-below and held parallel and spaced apart by one or more shims 38 so that a gap 39 exists between the casings 36 and 37 which is in registry with the slot 28 and is dimensioned to accommodate passage of a card 31. Screws 40 spaced along the longitudinal edges of casings 36 and 37 pass through holes in shims 38 and hold casings 36 and 37 assembled. The spacing between shims 38 is equal to the width of card 31. The forward edges of shims 38 curve outwardly to facilitate insertion of cards into gap 39.

Top casing 36 has a base 41, upstanding sides 42 and is preferably closed with a cover 43. Mounted extending transversely by means of a clamp 45 fastened to base 41 is a miniature motor and reduction gear combination 46 which is preferably D.C. operated and reversible. Pinion 47 is mounted on the outer end of the final shaft of motor and reduction gear 46 and pinion 47 drive a train of gears 48 which are affixed to one of the sides 42 by means of a series of pins 49. The final gear 51 of the train of gears is rotatably mounted on the forward end of top casing 36 and fits through a slot 52 in the base 41 to engage a similar gear 51 in bottom casing 37 as hereinafter explained. Gear 51 also turns horizontal transverse shaft 53 on which is mounted a rubberized roller 54 which fits into gap 39 through a slot 55 cut in base 41. Shaft 53 is flexibly mounted by means of two mounting brackets 56 shown in detail in FIG. 7. Each bracket 56 has a spring 57 held down by member 58 and formed with a reverse bend 59 into which the shaft 53 fits. Screw 60 (FIG. 7) adjusts the roller spring to set the pressure between the top and bottom rollers 54, 72. The mounting 56 permits the roller 54 to be moved slightly upward when a card 31 passes through the gap 39. It exerts sufficient downward force on roller 54, however, so that the card 31 is driven into the gap 39.

Also mounted in top casing 36 is a microswitch 61 having a switch arm 62 which extends down through a hole 63 in base 41 into the gap 39. When a card 31 is inserted through the slot 38 and into the gap 39, it engages arm 62 so that switch 61 starts motor 46 in forward direction. Spaced rearwardly on base 41 is a second microswitch 66 having a switch arm 67 extending into gap 39 through hole 68. When the card 31 is driven rearwardly through gap 39 until it contacts arms 67, switch 66 reverses motor 46 and causes the roller 54 which still engages the card to reverse the direction of movement thereof and discharge the card through slot 28.

Lower casing 37 has a base 71 in which is rotatably mounted bottom roller 72 which is similar to roller 54 and which projects through a slot 73 formed in base 71 and rotates on a shaft 74 which carries the gear 51 mating with the gear 51 of casing 36. Shaft 74 may be mounted by means of mountings 76 which resemble the mountings 56 of casing 36.

Likewise mounted on panel 27 is a bracket 78 for a plurality of electronic components 79 including the power supply and one or more printed circuit boards (not shown) located in lower casing 37.

Mounted on base 41 is a transducer (head) 69 which is located over the path of movement of strip 32 and functions to read the number of pulses 33 on card 31 as well as identifying indicia to prevent substitution of cards, to display the number of pulses on the card through window 29 and to erase one pulse as the card 31 is discharged. Simultaneously with the erasure of one pulse, a relay is closed which starts the laundry machine, vending machine, etc. The electronic system used with the head 69 is explained in detail hereinafter in this specification.

Referring to FIG. 12, there is recorded on the strip 32 of card 31 a plurality of sawtooth shaped magnetic signals or pulses 33 corresponding to the number of "credits" purchased by a patron. Each pulse comprises a ramp portion of relatively low slope and a step portion of relatively high slope. The sawtooth signal or the like is employed for detecting the direction in which the card 31 is moving past the head 69.

The magnitude of a current generated in a magnetic head, such as head 69, is a function of the rate of change of magnetic flux at the head. The polarity of the current is a function of the polarity of the rate of change of the flux. If a square pulse or any equivalently symmetrical pulse having a sufficiently high rate of change of flux at both its leading and trailing edges were employed on card 31, it may be noted that the head would output a signal of the same polarity regardless of the direction in which the card is moved past the head. This is because the slope of the leading and trailing edges of such a pulse would appear to the head as being of the same polarity. For example, with the card moving in one direction, the leading edge of a square pulse passing the head would have a positive slope. Thereafter, as the card moved in a reverse direction, the trailing edge of the same pulse would also appear to the head as a leading edge having a positive slope.

In a preferred form of the invention, a sawtooth rather than a square pulse, is used and a different result is obtained if the slope of the ramp portion is low enough so that no signal is generated in the head as the head traverses the ramp portion at a predetermined velocity. Under these circumstances insofar as the head is concerned, it "sees" only the rapidly changing step portion of the pulse and that portion of the pulse has a well defined polarity which is a function of the direction in which the card is moving. Thus, if the card is moving in such a direction that the head first traverses the ramp portion of the pulse, it will output a signal of one polarity corresponding to the negative slope of the high rate of change step portion. Conversely, if the card is moving in the opposite direction, it will first traverse the high rate of change step portion of that pulse and "see" a slope of opposite polarity. In essence, then, insofar as the head is concerned, with respect to any given pulse, it will "see" either a pulse with an infinitely long leading edge or an infinitely long trailing edge depending on the direction in which the card is moving.

For the foregoing reasons, as shown in FIG. 12A as the card 31 is moved inward of the reader 26 past head 69, the abrupt change in each of the ramps causes a positive pulse signal. When the card is moving in a reverse direction, there is a similar sharp pulse output signal of negative characteristics as shown in FIG. 12B. The output signals in either direction are used to perform the functions which have been hereinbefore generally described and which are hereinafter described in detail.

FIG. 13 is a preferred block diagram for the reader 26. FIG. 14 is a preferred schematic of the block diagram FIG. 13, it being understood that modifications therein will readily occur to one skilled in the art. The principal components of FIG. 13 block diagram as set forth in FIG. 14 are detailed in accompanying Table I. Values of the various components of FIG. 14 are set forth in accompanying Table II, it being understood that these values are merely illustrative.

Head 69 derives signals from the card 31 inserted in the machine. Head 69 produces positive pulses as the card enters the machine and negative pulses as the card emerges from the machine. These pulses are amplified in the pre-amp section and passed either to the positive pulse amplifier (which amplifies the "up" pulses or the "in" pulses) or to the negative pulse amplifier section (which amplifies the "down" pulses or the "outgoing" pulses). The positive pulse amplifier and negative pulse amplifier are biased in such a manner that they only amplify the pulses which are intended to pass through them. These pulses are used, in turn, to cause the up/down counter to count up or down. The "skip one pulse" is used to make possible the counting completely down to zero on the card as hereinafter explained. The up/down counter counts up until the first down pulse causes the down pulse enabler to feed a pulse into the counter which causes it to start counting down. The same pulse sets a long delay reset so that after lapse of a preselected time period (e.g. 10-15 seconds) everything is reset to zero condition. The successive "down pulses" derived from card 31 cause the up/down counter at this time to count down sequentially to zero. However, after one down pulse has passed, as determined by the "skip one down pulse" box, a freeze pulse is presented to the 7 segment digit driver which freezes it to the number which is one less than the highest number to which the counter counted. This is an optional but preferred arrangement used in order to indicate the number of credits left on the card after it has been used. This number is displayed by the 7 segment digit until the pulse which is designated "reset pulse" from the long delay reset causes the 7 segment digit to return to zero.

When first, the counter has returned to the zero level and, second, the down pulse output is in the down direction and, third, more than one pulse has been determined on the input, these three conditions cause the "AND gate" to enable an erase circuit which enables an erase oscillator signal to head 69 and thus erases the last pulse on the card as the card is emerging from the machine. At this time, the "wash enable" activates the "wash relay" which in turn is used to start the laundry machine or vending machine. Since the erase oscillator output feeds into head 69 and the preamp and all the other amplifiers can upset the counting sequence, the enabling pulse for the erase oscillator is also used to bias off the negative pulse amplifier and the positive pulse amplifier so that the subsequent circuits will be immune to this interfering signal in the head. This sequence of events occurs for each insertion of the card in the machine until there is only one pulse left on the card. The single last pulse does not enter into the up/down counter because of the "skip one" pulse circuit and the counter remains at zero and the "wash relay" is not activated.

Directing attention now to FIG. 14, when card 31 is inserted in the machine, transducer head 69 derives signals which are positive pulses as the card moves into the machine and negative pulses as the card moves out of the machine. These pulses are fed to the pre-amplifier and amplified by a factor of approximately 1,000. The output of the pre-amplifier is divided into two sections each of which consist of low-pass filters to suppress unwanted noise transients which might be present in the signal. The filtered signal is then passed into terminals 6 and 13 of I.C. 1-2 and I.C. 1-3. These two amplifiers are biased in opposite directions in order that one of them will amplify negative going pulses and one of them will amplify positive going pulses. The negative going pulses which are derived from the card as it travels out of the machine are titled B on the drawing. The positive going pulses which are derived from the card coming into the machine are entitled A in the drawing. The pulse polarities are depicted in the small diagrams accompanying each of the amplifiers on the drawings. At the output of the positive pulse amplifier and negative pulse amplifier, the amplitude of the wave form is approaching plus and minus five volts. At this point, the signal is introduced to standard TTL integrated circuits through resistors R-10 and R-22. The "up" pulses A are shaped so that at terminal 6 of I.C. 2-3 there is a negative going pulse of five volts amplitude. I.C. 2–6 shapes the B pulse to a positive going pulse at terminal 12 of I.C. 2-6. I.C. 5-2 and I.C. 6-2 are used together to skip the first type A pulse that enters the circuit so that the first pulse of the A type which reaches the counter I.C. 7 at terminal 15 is pulse number two of the A type. The reason for skipping the first pulse will be described later. The A type pulses cause the counter I.C. 7 to count up from zero to the maximum count or the maximum number of credits on the card. The binary coded output of I.C. 7 is fed to the 7 segment digit driver I.C. 4 which in turn drives the digital number displayed on I.C. 12. This is a 7 segment number of the type frequently used for digital numeric displays.

The maximum number of credits allowed in the present system is nine. Therefore, the digital indicator I.C. 12 shows 9 when a full card is inserted into the machine. As the direction of motion of the card reverses and the card starts out of the machine, negative going pulses or pulse types B commence emerging from the transducer head 69 and these pulses are fed to the counter I.C. 7. When, first, the counter I.C. 7 output indicates zero and, second, the counting sequence direction is in the down direction and, third, if more than one pulse has been fed into the system as determined by the "up" pulses enable, the coincidence of these conditions being determined in the "AND" gate, a pulse is generated by the AND gate which causes the two subsequent multi-vibrators I.C. 9 and I.C. 10 to be activated. The output of I.C. 10 (erase enable) activates the erase oscillator circuit consisting of T4 and the coil L1 in its collector circuit. This 3.5 KHz, 5 or 6 milliamp (for example) signal is transmitted to head 69 through capacitor C18 and the two back-to-back diodes D6 and D7. Diodes D6 and D7 isolate the erase circuit from head 69 when the head is being used for reading purposes. The diodes D1, D2 tied to pin 3 on I.C. 1-1, tend to limit the amplitude of the erase circuit signal so as not to damage I.C. 1-1. The amplitude of the erase signal is approximately 16 volts at head 69. Since this large amplitude signal would saturate the amplifiers and tend to disrupt the counting sequence in the subsequent circuitry, the output of I.C. 9 which occurs at the same time as the initiation of the erase signal is used to bias "off" the amplifier I.C. 1-2 and amplifier I.C. 1-3 so as not to allow any signal to come through these sections. The biasing action is achieved through the operation of bias gates designated T1 and T2 and remains in effect until after the erase signal has terminated. In other words, the time constant of I.C. 9 is slightly greater than the time constant of I.C. 10.

The first "down pulse" out of I.C. 5-1 which was used to control the direction of counting of I.C. 7 is also used to initiate the monostable multi-vibrator I.C. 11 which has a very long time constant and which determines the total length of time that the digit is displayed on I.C. 12. At the end of this time constant, a pulse is derived through I.C. 3—3 and capacitor C13 and fed to the reset terminal of counter I.C. 7. This resets the counter to zero. It also resets the circuitry that is used to skip the first input pulse. As the series of "down" pulses commences, the counter I.C. 7 changes its output indication to correspond to the appropriate down pulse number. The display driver I.C. 4 subsequently causes the appropriate number to be displayed on the digital display I.C. 12. However, after the down counting sequence has moved one digit, the circuitry involving I.C. 8-2 generates an output pulse which freezes the number represented by the second down pulse so as to give a continuous display on I.C. 12 of the number of credits remaining on card 31.

In the foregoing description, it is noted that there is one extra pulse on card 31. The reason for this is now described. As card 31 emerges from the machine, the up/down counter I.C. 7 counts down to zero, at which time the erase enable I.C. 10 is initiated to erase a pulse on the card. However, when the counter counts to zero, there would be no more pulses on the card and there would be nothing left to erase, so an extra pulse is recorded on card 31 initially; and then when the counting sequence commences as the card enters the machine, the first pulse is skipped by the "skip one pulse" box consisting of I.C. 5-2 and I.C. 6-2. When the counter counts up and then subsequently counts down to zero and the erase circuit is activated, there is still one remaining pulse on the card to be erased by the erase current.

Figure 6:
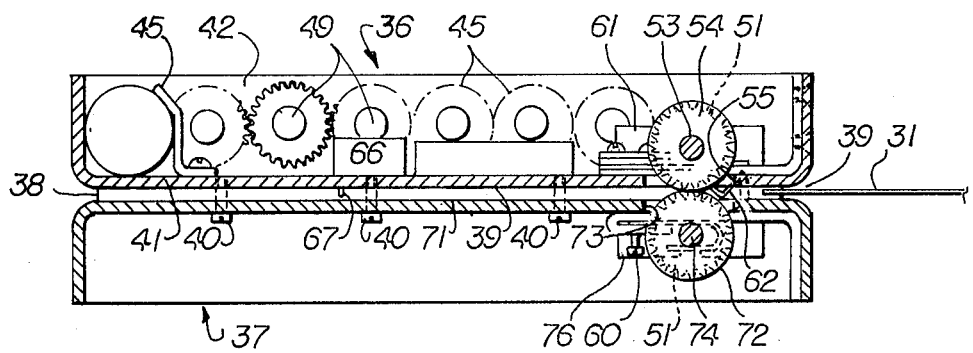
FIG. 6 is a vertical sectional view taken substantially along the line 6—6 of FIG. 5.

In order to prevent card 31 from being returned to the patron when the last credit has been erased, another set of rollers may be mounted in the reader 26 which is enegized from motor 46 through a clutch to drive the card to the left, as viewed in FIGS. 5 and 6, and into a receptacle in box 21. Thus the card 31 may be re-used after being encoded once again. Further, the fact that the card is not returned to the patron reduces the possibility of litter from discarded cards and also any temptation for the patron to tamper with the encoding.

In the foregoing description and accompanying drawings, card 31 is motor-driven past the head 69. However, with the saw tooth pulse being encoded on the card, the motor 46 and rollers 54, 72 may be eliminated and the card 31 manually inserted in slot 39 and into gap 38 and then withdrawn. If the card is moved manually with sufficient velocity the electronic circuitry above defined will function satisfactorily.

Moreover, the use of the sawtooth signal and circuitry responsive thereto as described herein avoids the necessity for requiring complete insertion of the card in the machine since the circuitry will still function to activate the machine even though the card is only partially inserted, one pulse being erased for each energization of the wash relay even though it is not the last pulse on the card.

Encoder 86 is used to encode cards 31 with a number of pulses 33. Such encoder is located at a central point where suitable security exists. Top casing 87 is closed with a top cover 88 and mounted above bottom casing 89 with a gap 91 dimensioned for card 31. Bottom casing 89 has a front panel 92 formed with an indicator window 93 surrounded by a bezel and also having extending therethrough the perimeter of a wheel 94 which may be manually adjusted for a given number of pulses to be encoded on to the card 31. Within casing 89 is a motor 96 having a shaft 97 here shown as projecting out one side of casing 86 and carrying a drive pulley 98 which, through belt 99, drives a plurality of speed reduction idler pulleys 101 mounted on the outside of casing 86 through belts 102. The final shaft 103 extends into the casing 89 and carries on its inner end a gear 106 which mates with a gear 118 on front bottom transverse horizontal shaft 118 on which is mounted bottom roller 119. Shaft 118 carries a gear (not shown) which meshes with gear 107 on top front transverse horizontal shaft 108, appropriate holes being formed in the casing so that the gears can mesh. Front top roller 109 is fixed to shaft 108. Shaft 108 also carries one of a pair of pulleys 111 which are connected together by belt 112, the rearward pulley 111 being fixed on rear top shaft 113 which also carries a rear top roller 114. Rollers 109 and 114 extend down through slots in the bottom of casing 87 into the gap 91 through which card 31 passes. Top shafts 108 and 113 are mounted on casing 87 by means of supports 116 which resemble the support 56 shown in FIG. 7. In bottom casing 89 are similar supports 117 for bottom front shaft 118 which carries bottom front roller 119 which mates with roller 109. Bottom rear shaft 122 is driven from shaft 118 in the same manner as shaft 113 is driven from shaft 108. Shaft 122 carries a roller 123 which mates with roller 114.

Mounted in casing 87 is a magnetic record head (transducer) 126 which is positioned to magnetically act upon the strip 32 of card 31. A photocell 127 and exciter lamp mounted in casings 87 and 89 has an upper element which views through a hole 128 in casing 87. Motor 96 drives rollers 109, 114, 119, 123 continuously while the encoder is operating. The photocell and lamp 127 operating together indicate when card 31 is in proper position with respect to head 126 gap and at such time the electrical components hereinafter described generate the appropriate number of pulses (determined by the manual setting of selector switch 94) to be recorded on card 31.

FIG. 15 is the block diagram of the magnetic card recorder circuit and FIG. 16 is the circuit diagram therefor. Table III shows the principal components of the blocks of FIG. 15 as are set forth in the circuit diagram FIG. 16. Table IV shows representative values of the various components of FIG. 16, it being understood that these are subject to variation.

When the recording machine is turned on, the rollers 109, 119, 114, 123, which draw card 31 into the encoder 86 and push it out are continuously turning so that any time a card 31 is inserted, it is immediately pulled through the machine. When the leading edge of card 31 reaches photocell 127, it interrupts light from the exciter lamp and, in turn, activates the rest of the circuitry. The output from the photocell 127 is amplified in photocell amplifiers T41 and T42. It then opens a gate in the block entitled "count inhibit" which allows the pulses from the pulse generator to pass into the programmable counter. This counter has been set by a digital decade selector switch SW1 so that when the desired number of pulses has passed through the transmission gate into head 126, the count inhibit circuit stops further pulses. The block entitled "skip one pulse" enables the counter to record one more pulse on the card than has been indicated by the position of the switch SW1. The purpose of this extra pulse has been described in connection with the reader circuit. The output from the pulse generator is also fed to the box entitled "pulse shaper" which converts the pulses into a ramp shape or saw tooth wave form. (See FIG. 12). The purpose of the saw tooth wave form is to cause the card reader head 69 to produce positive pulses when the card is passing into the reader and negative pulses when the card is coming out of the reader. The box entitled "record bias oscillator" T44 is required in order that the ramp section of the saw tooth wave form be recorded in a linear manner as is normally done in direct recording of signals on magnetic tapes.

A signal from the record bias oscillator is also fed to an "erase" head 131 positioned ahead of "record" head 126 to remove any remnant magnetic signals still on card 31.

The term "saw tooth shape", as used in the accompanying claims in referring to pulses recorded on magnetic strips, shall be understood to mean a magnetic signal having a slowly changing ramp portion (when flux density is plotted against linear distance along said strip) terminating in a rapidly changing step portion.

TABLE I

| FIG. 13 Block | FIG. 14 Principal Components |
|---|---|
| Pre Amp | I.C. 1-1 |
| Positive Pulse Amp | I.C. 1-3 |
| Negative Pulse Amp | I.C. 1-2 |
| Skip One Pulse | I.C. 5-2, 6-2 |
| Up Pulse Enable | I.C. 5-2, 6-2, 8-1 |
| Down Pulse Enable | I.C. 5-1 |
| "Or" Gate | I.C. 6-1 |
| "And" Gate | I.C. 6-3 |
| Up/Down Counter | I.C. 7 |
| 7 Segment Digit Driver | I.C. 4 |
| 7 Segment Digit | I.C. 12 |
| Long Delay Reset | I.C. 11 |
| Skip One "Down" Pulse | I.C. 8-2 |
| Erase Enable | I.C. 10 |
| Erase Oscillator | T4 |
| Wash Enable | I.C. 9, T3, I.C. 3-1 |
| Wash Relay | RY1 |
| Bias Gate No. 1 | T2 |

TABLE I-continued

| FIG. 13 Block | FIG. 14 Principal Components |
|---|---|
| Bias Gate No. 2 | T1 |

TABLE II

| R 1 | 2.4 | K | R 14 | 1 | M | R 27 | 15 | K |
|---|---|---|---|---|---|---|---|---|
| 2 | 3.3 | M | 15 | .3 | M | 28 | 1.5 | M |
| 3 | 1.6 | K | 16 | 560 | | 29 | .9 | M |
| 4 | .33 | M | 17 | 1.2 | K | 30 | 13 | K |
| 5 | 1.2 | K | 18 | 1.2 | K | 31 | 68 | Ω |
| 6 | 1.2 | K | 19 | 2.4 | M | 32 | 0.5 | M |
| 7 | 13 | K | 20 | 3.3 | K | 33 | 0.5 | M |
| 8 | 1.2 | K | 21 | .33 | M | 34 | 5.1 | K |
| 9 | .91 | M | 22 | 5.6 | K | 35 | 2.2 | K |
| 10 | 5.6 | K | 23 | 220 | | 36 | 2.2 | K |
| 11 | 1 | K | 24 | 1.5 | K | 37 | 3.3 | K |
| 12 | 680 | | 25 | 1 | K | | | |
| 13 | .47 | M | 26 | 15 | K | | | |

| C 1 | 1 | μfd | C 7 | 0.1 | | C 13 | 0.01 | |
|---|---|---|---|---|---|---|---|---|
| 2 | 1 | | 8 | 0.1 | | 14 | 3 | |
| 3 | 0.1 | | 9 | 0.001 | | 15 | 2 | |
| 4 | 0.01 | | 10 | 0.01 | | 16 | .44 | |
| 5 | 20 | | 11 | 0.01 | | 17 | 3.3 | |
| 6 | 1 | | 12 | 3 | | 18 | 0.1 | |

| T 1 | 2N 3906 Fairchild | D 1 to D 8 | | 914 Fairchild |
|---|---|---|---|---|
| 2 | 2N 3906 Fairchild | L 1 | | Miller H 109 |
| 3 | 2N 3906 Fairchild | RY 1 | | Relay |
| 4 | 2N 3904 Fairchild | | | |

| I.C. 1-1 | L 144 Siliconix | I.C. 5-1 | | 7474 Fairchild |
|---|---|---|---|---|
| 1-2 | L 444 Siliconix | 5-2 | | 7474 Fairchild |
| 1-3 | L 144 Siliconix | 6-1 | | 9015 Fairchild |
| 2-1 | 9016 Fairchild | 6-2 | | 9015 Fairchild |
| 2-2 | 9016 Fairchild | 6-3 | | 9015 Fairchild |
| 2-3 | 9016 Fairchild | 7 | CD | 4510 R.C.A. |
| 2-5 | 9016 Fairchild | 8-1 | | 7474 Fairchild |
| 2-6 | 9016 Fairchild | 8-2 | | 7474 Fairchild |
| 3-1 | 9016 Fairchild | 9 | | 555 Signetics |
| 3-3 | 9016 Fairchild | 10 | | 555 Signetics |
| 3-5 | 9016 Fairchild | 11 | | 555 Signetics |
| 3-6 | 9016 Fairchild | 12 | FND | 507 Fairchild |
| 4 | 9374 Fairchild | | | |

TABLE III

| Fig. 15 Block | Fig. 16 Principal Components |
|---|---|
| Photocell Amp | T 41, 42 |
| Skip One Pulse | I.C. 41-6, 42-3 |
| Count Inhibit | I.C. 42-1, 41-2, 43-1, 42-2, 42-4, 41-4 |
| Programmable Counter | I.C. 44 |
| Decade Selector Switch | SW 1 |
| Transmission Gate | I.C. 47 |
| Mixer | T 43 |
| Record Bias Oscillator | T 44 |
| Pulse Generator | I.C. 45 |
| Pulse Shaper | I.C. 46 |

TABLE IV

| R 41 | 0.1 | M | R 48 | 50 | K Pot. | R 55 | 30 | K |
|---|---|---|---|---|---|---|---|---|
| 42 | 5.6 | K | 49 | 10 | K Pot. | 56 | 10 | K |
| 43 | 13 | K | 50 | 1 | K | 57 | 1.2 | K |
| 44 | 1 | K | 51 | 10 | K Pot. | 58 | 75 | K |
| 45 | 10 | K | 52 | 10 | K Pot. | 59 | 1.6 | K |
| 46 | 0.27 | M | 53 | .27 | M | | | |
| 47 | 62 | | 54 | 22 | K | | | |

| C 41 | 0.1 | μfd | C 45 | 0.01 | | C 49 | 0.01 | |
|---|---|---|---|---|---|---|---|---|
| 42 | 0.1 | | 46 | 3.2 | | 50 | 0.0015 | |
| 43 | 0.1 | | 47 | 2 | | 51 | 0.01 | |
| 44 | 4 | | 48 | 1 | | | | |

| T 41 | 2N 3904 Fairchild | L 41 | Miller H 104 |
|---|---|---|---|
| 42 | 2N 3904 Fairchild | L 42 | Miller 6333 |
| 43 | 2N 3904 Fairchild | | |
| 44 | 2N 3904 Fairchild | D 41 | 914 Fairchild |

| I.C. 41-1 | CD 4049 RCA | I.C. 42-3 | CD 4001 RCA |
|---|---|---|---|
| 41-2 | CD 4049 RCA | 42-4 | CD 4001 RCA |
| 41-3 | CD 4049 RCA | 43-1 | CD 4013 RCA |
| 41-4 | CD 4049 RCA | 43-2 | CD 4013 RCA |
| 41-5 | CD 4049 RCA | 44 | CD 4018 RCA |

TABLE IV-continued

| 41-6 | CF 4049 RCA | 45 | 555 Signetics |
| 42-1 | CD 4001 RCA | 46 | 741 Fairchild |
| 42-2 | CD 4001 RCA | 47 | CD 4066 RCA |

What is claimed is:

1. A reader for a card substitute for coins in actuating a machine, said card having a longitudinally extending magnetic strip encoded with one or more effective pulses, said reader comprising a casing having plates spaced apart in a longitudinally extending gap slightly greater than the thickness of said card and wide enough to receive said card, said casing having a front formed with a slot in registry with said gap and dimensioned to receive said card, a reversible motor in said casing, a first and second shaft each resiliently mounted transversely and parallel to said plates, a first and second roller each fixed to one of said shafts and extending into said gap to grip and transport a card inserted into said slot through said gap, a first switch in said casing having first switch actuating means extending into said gap positioned to be actuated by the leading edge of a card inserted into said slot to actuate said first switch to energize said motor in a first direction, first drive means interconnecting said motor and said first shaft, second drive means driving said second shaft from said first shaft in a direction opposite said first shaft, a second switch having second switch actuating means extending into said gap a fixed distance inward of said first switch actuating means positioned to be actuated by the leading edge of said card when it has been moved by said rollers into said gap a fixed distance to actuate said second switch to reverse said shafts, a transducer head in said casing positioned along the path of movement of said strip to read pulses on said card and to erase pulses and electrical circuitry for said head to count the pulses on said strip as said card moves inward and then count down the pulses on said strip as said card moves outward, erase one pulse and energize a relay, said circuitry including an up/down counter, a "skip one down pulse" function, and an "erase" function, arranged so that said counter is not actuated in an up direction by the first pulse on said strip as said strip moves inward and the last pulse on said strip is erased as said strip moves outward, said relay adapted to energize said machine.

2. A reader according to claim 1 in which said electrical circuitry comprises a digital display to show the total number of effective pulses on said strip as said card goes into said gap and then the total number of effective pulses remaining after said card leaves said gap, said panel formed with a window for observation of said digital display.

3. In combination, a reader according to claim 1 and an outer casing of the type normally housing the coin accepting mechanism for a coin-operated laundry or vending machine having a second front panel formed with a pair of openings and said outer casing having a depth greater than said reader casing, said reader casing fitting through one of said openings, said reader front panel congruent to said second front panel.

4. A reader according to claim 1 in which said motor is located at an end of said casing remote from said reading head and said first drive means extends longitudinally along one edge of said casing.

5. A reader according to claim 4 in which said first drive means comprises a plurality of gears in a train and means mounting said gears longitudinally spaced apart along said casing.

6. A reader according to claim 1 in which said casing comprises top and bottom sections, each having a base, upstanding sides and a cover, and shims interposed between the longitudinal edges of said sections of a thickness equal to that of said card and having inner edges spaced apart the width of said card, said bases and shims defining said gap.

7. A reader according to claim 6 which further comprises mounting means for attaching said first shaft to one of said bases, said mounting means comprising a reverse bend of flat spring material, said bend supporting said first shaft, whereby said first shaft can flex toward and away from said base so that said first roller can grip and then roll over said card.

8. A reader according to claim 7 which further comprises an adjustment screw to adjust the roller pressure, said screw passing through said spring material and threaded into said base.

9. A reader for a card substitute for coins in actuating a machine, said card having a longitudinally extending magnetic strip encoded with one or more effective pulses, said reader comprising a casing having plates spaced apart in a longitudinally extending gap slightly greater than the thickness of said card and wide enough to receive said card, said casing having a front formed with a slot in registry with said gap and dimensioned to receive said card, a reversible motor in said casing, a first and second shaft each resiliently mounted transversely and parallel to said plates, a first and second roller each fixed to one of said shafts and extending into said gap to grip and transport a card inserted into said slot through said gap, a first switch in said casing having first switch actuating means extending into said gap positioned to be actuated by the leading edge of a card inserted into said slot to actuate said first switch to energize said motor in a first direction, first drive means interconnecting said motor and said first shaft, second drive means driving said second shaft from said first shaft in a direction opposite said first shaft, a second switch having second switch actuating means extending into said gap a fixed distance inward of said first switch actuating means positioned to be actuated by the leading edge of said card when it has been moved by said rollers into said gap a fixed distance to actuate said second switch to reverse said shafts, a transducer head in said casing positioned along the path of movement of said strip to read pulses on said card and to erase pulses and electrical circuitry for said head to count the pulses on said strip as said card moves inward and then count down the pulses on said strip as said card moves outward, erase one pulse and energize a relay, said relay adapted to energize said machine, said pulse encoded on said strip having a ramp portion of polarity of uniform gradually increasing polarity ending in an abrupt change of opposite polarity, said head creating no signal as said ramp portion passes in proximity thereto and a pulse signal is created as the abrupt change passes in proximity thereto.

10. A reader according to claim 9 in which said electrical circuitry has an up/down counter, a positive pulse amplifier biased to receive only positive pulses from said head and arranged to cause said counter to count up, a negative pulse amplifier biased to receive only negative pulses from said head and arranged to cause said counter to count down, an erase circuit energized when no counts remain in said counter to erase one pulse from said strip, said relay actuated when said erase circuit is energized.

11. A reader according to claim 10 which further comprises a "skip one" subcircuit between said positive pulse amplifier and said counter to cause said counter not to receive the first pulse on said strip.

12. A reader according to claim 11 which further comprises a digital display visible from the exterior of said casing having a driver circuit connected to said counter to first show the total number of effective pulses counted by said counter and then to show one less number of pulses to indicate the number of effective pulses remaining on the card, said driver being connected to a multi-vibrator having a long time constant so that the number of effective pulses remaining on said card is displayed for a predetermined period of time and then reset to zero.

13. A system for energizing a laundry or vending machine without the use of coins comprising a card having a longitudinally extending magnetic strip encoded with one or more effective pulses, a reader including a casing having plates spaced apart in a longitudinally extending gap slightly greater than the thickness of said card and wide enough to receive said card, said casing having a front formed with a slot in registry with said gap and dimensioned to receive said card, a reversible motor in said casing, a first and second shaft each resiliently mounted transversely and parallel to said plates, a first and second roller each fixed to one of said shafts and extending into said gap to grip and transport a card inserted into said slot through said gap, a first switch in said casing having first switch actuating means extending into said gap positioned to be actuated by the leading edge of a card inserted into said slot to actuate said first switch to energize said motor in a first direction, first drive means interconnecting said motor and said first shaft, second drive means driving said second shaft from said first shaft in a direction opposite said first shaft, a second switch actuating means extending into said gap a fixed distance inward of said first switch actuating means positioned to be actuated by the leading edge of said card when it has been moved by said rollers into said gap a fixed distance to actuate said second switch to reverse said shafts, a transducer head to said casing positioned along the path of movement of said strip to read pulses on said card and to erase pulses and electrical circuitry for said head to count the pulses on said strip as said card moves inward and then count down the pulses on said strip as said card moves outward, erase one pulse and energize a relay, said circuitry including an up/down counter, a "skip one down pulse" function, and an "erase" function, arranged so that said counter is not actuated in an up direction by the first pulse on said strip as said strip moves inward and the last pulse on said strip is erased as said strip moves outward, said relay adapted to energize said machine and an encoder to encode pulses on said strip, said encoder having an electrical circuit having a sub-circuit to shape pulses recorded on said strip in saw tooth shape.

14. A system according to claim 13 in which said encoder comprises a selector switch to record effective pulses for a given number of actuations of said machine and said encoder electrical circuitry comprises means for recording on said strip one more pulse than said given number and said reader electric circuit comprises an up/down counter, means to count the pulses on said strip as said card is inserted into said reader and transmit to said counter one less pulse than the number of said pulses to drive said counter to count up, means to count the pulses on said strip as said card is withdrawn from said reader and transmit to said counter said pulses until the counter counts down to zero, and means responsive to said counter counting down to zero to erase one pulse from said strip and energize said relay.

15. A system accordng to claim 14 in which said reader comprises a digital display visible from the exterior of said casing and a driver therefor, said reader circuit comprising means to display on said display the total number of up counts of said counter and then to display for a period of time one less than said total number of up counts to indicate the number of effective pulses remaining on said strip after each use of a card.

16. An encoder for a card substitute for coins in a laundry or vending machine, said card having a longitudinally extending magnetic strip, said encoder comprising a casing having a panel formed with an opening shaped to receive an end of said card, said casin formed to define a gap of passage of said card from said opening to a discharge end of said casing, first and second vertically aligned, transverse shafts above and below said gap, mounting means for said first and second shafts to mount said shafts in said casing, first and second rollers on said first and second shafts extending into said gap to drive a card from said opening toward said discharge end, a motor in said casing, drive means connected to said motor to drive said first and second shafts in opposite directions, a recording head mounted in said casing positioned to record on said strip as said card is driven through said gap and an electrical circuit to actuate said recording head, a digital switch to control the number of effective pulses recorded on said strip, said electrical circuit comprising a shaping subcircuit to record on said strip saw tooth shaped pulses, and an electrical sub-circuit to record on said strip one extra pulse more than that indicated by said digital switch.

17. An apparatus for use with a magnetic strip bearing magnetic signals comprising:
 means including a magnetic head responsive to said magnetic signals for providing a positive pulse corresponding to each magnetic signal on said strip which passes said head when said strip is moved past said head in one direction and a negative pulse corresponding to each magnetic signal on said strip which passes said head when said strip is moved past said head in an opposite direction; and
 means responsive to said positive and said negative pulses for generating a control signal and for erasing from said strip at least one of said magnetic signals each time said control signal is generated, said responsive means comprising:
 counting means;
 means responsive to said positive pulses for incrementing said counting means with a predetermined number of said positive pulses and to said negative pulses for decrementing said counting means; and
 means responsive to said decrementing of said counting means for generating said control signal and for said erasing of said magnetic signal from said strip.

18. An apparatus according to claim 17 wherein the number of magnetic signals on said magnetic strip exceeds by one the number of times it is intended that said strip is to be used for generating a control signal, and wherein said predetermined number of positive pulses used for incrementing said counting means is one less than the total number of positive pulses obtained from said magnetic signals on said strip whereby said counting means is decremented to zero by said negative pulses.

19. An apparatus according to claim 17 wherein said responsive means further comprises means for preventing incrementing and decrementing of said counting means during said erasing of said magnetic signal from said strip.

20. An apparatus according to claim 17 wherein each of said magnetic signals on said strip is a saw-tooth-shaped signal having a slowly changing ramp portion and a rapidly changing step portion; and further wherein said positive and negative pulses are generated in response to said rapidly changing step portion as said strip is moved past said head in said opposite directions.

21. An apparatus for use with a magnetic strip bearing a plurality of magnetic signals which exceed by one in number the number of times said strip is usable for generating a control signal, comprising:

magnetic head means for generating a positive pulse for each one of said magnetic signals passing said head when said strip is moved past said head in one direction and a negative pulse for each one of said magnetic signals passing said head when said strip is moved past said head in an opposite direction;

a first amplifying means for amplifying said positive pulses; a second amplifying means for amplifying said negative pulses;

counting means;

means responsive to the output of said first amplifying means for incrementing said counting means a number of times corresponding to one less than the number of said positive pulses;

means responsive to the output of said second amplifying means for decrementing said counting means to zero;

means coupled to said counting means for displaying the number in said counting means immediately before and after said counting means is first decremented;

means for generating a control signal when said counting means has been decremented to zero;

means for erasing at least one of said magnetic signals from said strip when said counting means has been decremented to zero; and means for inhibiting said first and said second amplifying means during said erasing of said magnetic signal.

22. A magnetic strip encoding and decoding apparatus comprising:

an encoding means for encoding on said magnetic strip a number of magnetic signals, said number corresponding to a predetermined number of times said strip is intended to be used for generating a control signal; and a decoding means responsive to said magnetic signals for generating said control signal and erasing from said strip at least one of said magnetic signals each time said machine is activated, said magnetic signals on said strip being saw tooth-shaped signals having a first relatively slowly changing ramp portion and a second relatively rapidly changing step portion, said encoding means including means for encoding said saw tooth magnetic signals on said magnetic strip; and further wherein said decoding means comprises means for generating a positive pulse in response to said second relatively rapidly changing step portion when said strip is moving in one direction and a negative pulse in response to said second relatively rapidly changing step portion when said strip is moving in an opposite direction, incrementing and decrementing counter means for registering the data decoded from said magnetic strip as said strip is moved through said decoding means in said one direction and in said opposite direction and means responsive to said decoding means for actuating an external device inward and the last pulse on said strip is erased as said strip moves outward, said relay adapted to energize said machine.

23. An apparatus according to claim 22 further comprising: means selectively responsive to said positive and said negative pulses for generating said control signal and said erasing of said magnetic signal from said strip when said strip is moved in said opposite direction.

24. An apparatus according to claim 23 wherein said selectively responsive means comprises:

an up/down counting means;

means responsive to said positive pulses for incrementing said counting means and to said negative pulses for decrementing said counting means; and means responsive to said counting means for displaying immediately after a first decrementation of said counting means the number of times said strip may be used thereafter for generating said control signal.

25. An apparatus according to claim 24 further comprising means for moving said strip in said opposite directions in said decoding means.

26. An apparatus according to claim 25 wherein said encoding means further comprises a manually settable switch means manually settable to a position corresponding to the number of times it is desired to use said card for generating said control signal and means responsive to said switch means for encoding on said strip a corresponding predetermined number of said magnetic signals.

27. An apparatus according to claim 26 wherein said corresponding predetermined number of said magnetic signals exceeds by one the number of times it is desired to use said strip for generating said control signal.

* * * * *